(12) United States Patent
Jayanetti et al.

(10) Patent No.: US 7,250,940 B2
(45) Date of Patent: Jul. 31, 2007

(54) TOUCH SCREEN APPARATUS AND METHOD THEREFORE

(75) Inventors: Ruwan Jayanetti, Nugegoda (LK); Llavanya Fernando, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 529 days.

(21) Appl. No.: 10/750,176

(22) Filed: Dec. 31, 2003

(65) Prior Publication Data

US 2005/0140662 A1    Jun. 30, 2005

(51) Int. Cl.
*G09G 5/00* (2006.01)

(52) U.S. Cl. ..................................... 345/173
(58) Field of Classification Search ......... 345/173–179
See application file for complete search history.

(56) References Cited

U.S. PATENT DOCUMENTS

| | | | |
|---|---|---|---|
| 4,623,757 A | 11/1986 | Marino | |
| 5,859,392 A * | 1/1999 | Petty | 178/18.01 |
| 6,061,051 A | 5/2000 | Chan et al. | |
| 6,075,520 A * | 6/2000 | Inoue et al. | 345/173 |
| 6,278,444 B1 | 8/2001 | Wilson et al. | |
| 6,411,284 B1 * | 6/2002 | Junghans | 345/173 |
| 6,483,498 B1 * | 11/2002 | Colgan et al. | 345/173 |
| 6,501,529 B1 | 12/2002 | Kurihara et al. | |
| 6,630,896 B1 | 10/2003 | Nathan | |
| 6,975,307 B2 * | 12/2005 | Chang et al. | 345/174 |
| 6,980,201 B1 * | 12/2005 | Dotson | 345/173 |
| 2002/0101407 A1 | 8/2002 | Berelovich et al. | |
| 2003/0222857 A1 * | 12/2003 | Abileah | 345/173 |

FOREIGN PATENT DOCUMENTS

JP    06-348390 A    4/1995

OTHER PUBLICATIONS

Wolfe A., A case study in low-power system-level design, Oct. 2, 1995, Computer Design: VLSI in computers and processors 1995. ICCD 95. Proceedings, 1995 IEEE International Conference on Austin, TX, USA, XP010197331, p. 332-338.
Horowitz P., Hill W.: The Art of Electronics, Second Edition, 2001, Cambridge University Press, Cambridge, UK XP002339423, p. 184.

* cited by examiner

*Primary Examiner*—Amr A. Awad
*Assistant Examiner*—Stephen G Sherman
(74) *Attorney, Agent, or Firm*—Ingrassia Fisher & Lorenz PC

(57) ABSTRACT

Methods and apparatus are provided for an apparatus for inputting data. The apparatus comprises a detection circuit for providing a first reference voltage to a first and a second electrode of a first conductive layer of a resistive touch screen and providing a second reference voltage to a first and a second electrode of a second conductive layer of the resistive touch screen. The detection circuit maintains the first and second reference voltages under quiescent conditions and when the first and second conductive layers couple together. The method includes applying substantially equal voltages to the first and second electrodes of the first conductive layer of the resistive touch screen. Substantially equal voltages are applied to the first and second electrodes of the second conductive layer of the resistive touch screen. Approximately zero current is conducted in the first and second conductive layers under quiescent conditions.

5 Claims, 7 Drawing Sheets

TOUCH SCREEN APPARATUS AND METHOD THEREFORE

TECHNICAL FIELD OF THE INVENTION

The present invention generally relates to devices for inputting data to a system, and more particularly relates to resistive touch screens.

BACKGROUND OF THE INVENTION

Touch screen devices are widely used in devices such as ATM's, PDA's, computers, or point-of-sale devices to allow human input of information to an electronic system. A touch screen is a device that, when touched, generates signals identifying a location on a screen where contact was made. Underlying the touch screen is a visual medium such as a cathode ray tube or liquid crystal display tat displays an image. The signals from the touch screen are provided to the electronic system to relate the point of contact to the image on the display. In addition there are signature capture devices which do not include a display beneath the touch screen or touch pad.

An example of an application where a touch screen is commonly used is in an ATM. The ATM is typically placed in a location that is accessible to a wide number of people. People use the ATM to perform banking functions such as depositing, withdrawing, and verifying account balances of a personal bank account. One method for entering the account number to the system is through a card reader on the ATM. The card reader reads the account number off of a magnetic strip on the bankcard. As protection to the user, the account is password protected to prevent a non-authorized person from access. The password is often a combination of digits known only by the user and is entered using the touch screen on the ATM. The user sees a number pad on the ATM display. The user touches the numbers on the pad corresponding to the password. The touch screen sends signals to the ATM that describes the location touched on the display. The ATM converts the locations touched on the touch screen and identifies them to the numbers on the number pad shown on the ATM display. The user will be allowed to access the account if the numbers entered matches the password. Similarly, touch screen devices are also frequently used to take electronic signatures at the point of sale. Everyday examples include writing signatures on a touch screen pad at a retail shop or at an ATM machine after desired transactions are complete.

In general, a touch screen is implemented in four different ways: capacitive, magnetic, surface acoustic wave, and resistive.

In a capacitive touch screen system, a charge storage layer is formed on the touch screen. Touching the screen, for example with a finger, transfers charge to the user thereby decreasing the charge on the charge storage layer of the touch screen. The decrease in the amount of charge (due to the contact) is measured by sensors located at each corner of the screen. A microcomputer receives the signals from the sensors and calculates the coordinates where contact has occurred from the relative differences in charge at each corner and relays that information to the touch screen driver software.

In magnetic based touch screen systems, a grid of magnetic energy is propagated in the X-Y dimension. An example application for a magnetic based touch screen is for capturing a signature. An active stylus is used to write and capture a signature. Information from the active stylus is provided to a microprocessor that reproduces the X and Y coordinates corresponding to the signature for use by the system.

A surface acoustic wave touch screen uses a transmitting transducer and a receiving transducer placed along the x and y axis of the top layer of the touch screen to determine a location of contact. Reflectors are also placed on the top layer to reflect an electrical signal sent from one transducer to another. The receiving transducer can tell if the wave has been disturbed by a touch event at any given instant and can pinpoint its position accordingly.

A resistive touch screen is probably the most widely used and cost effective touch screen on the market today. A resistive touch screen comprises a scratch-resistant layer that protects two conductive layers held apart by spacers. The scratch-resistant layer and the conductive layers are transparent to allow viewing of the underlying display. In a simplified model of a resistive touch screen each conductive layer is modeled as a resistor. An electrical current is conducted by the resistive touch screen when a voltage is applied across a conductive metallic layer. In general, one conductive layer of the resistive touch screen is operated such that current flows in the x-direction while the other conductive layer is operated such that current flows in the y-direction. When an object touches the screen, the two conductive layers make contact creating a bridge resistance between the x and y axis. An approach for determining the point of contact on the resistive touch screen is to separately sense a voltage at the point of contact in the x-direction and the y-direction. Each conductive layer is a resistor divider, sensing the voltage at the point of contact allows the position to be calculated. Knowing the position on the resistive touch screen in both the x and y direction identifies the location of contact.

One problem associated with resistive touch screens is the rapid switching between the conductive layers that is required to read the location at the point of contact. Switching allows either conductive layer to be biased and a voltage sensed. The rate of switching and sensing of either conductive layer is selected to ensure that both the x and y coordinates can be calculated within a normal time period associated with a person touching a touch screen. The switching circuitry adds complexity to the design. Moreover, the switching itself generates noise and voltage spikes that are troublesome to the electronics interfacing with the resistive touch screen and can also result in inaccurate measurements.

A second problem for a resistive touch screen is security when used for a secure transaction such as an ATM or point of sale verification. In particular, there is the threat that the wires coupling the resistive touch screen to a main printed circuit board (system circuitry) could be monitored. The change in voltage on these wires could be detected easily thus allowing someone to steal the information being input. For example, eavesdropping can be achieved by parallel connection of a voltmeter to the wires or by inductively sensing the change in voltage. This is a major security concern for transfer of signatures or PIN's from resistive a touch screen pad to other electrical devices.

Accordingly, it is desirable to provide a resistive touch screen pad that does not require noise generating switching to extrapolate position and pressure at the point of contact. In addition, it is desirable to ensure secure data transfer by making eavesdropping between a touch screen device and other electronics difficult. It would be of further benefit to provide a touch screen-sensing scheme that can operate at a low voltage to achieve energy savings in the device. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

Methods and apparatus are provided for inputting data to a system. The apparatus comprises a detection circuit coupled for providing a first reference voltage to the first and second electrodes of a first conductive layer of a resistive touch screen. The detection circuit is coupled for providing a second reference voltage to the first and second electrodes of a second conductive layer of the resistive touch screen. The detection circuit maintains the first and second reference voltages under both a quiescent condition and when resistive touch screen is touched. The method comprises applying substantially equal voltages to a first and a second electrode of a first conductive layer or a resistive touch screen. Substantially equal voltages are applied to a first and a second electrode of a second conductive layer of a resistive touch screen. Approximately zero current is conducted in the first and second conductive layers of the resistive touch screen under quiescent conditions.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
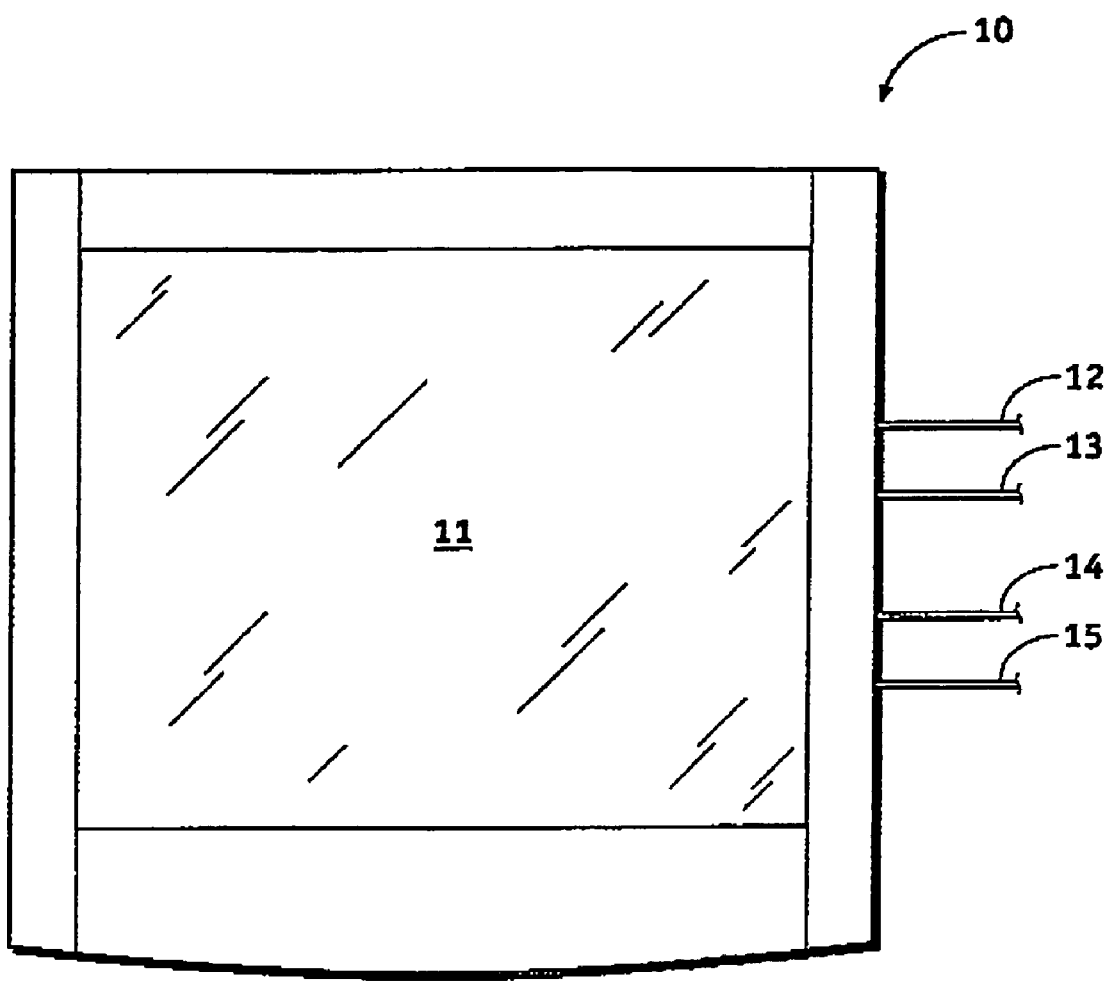
FIG. 1 is a top view of a prior art resistive touch screen.

FIG. 1 is a top view of a prior art resistive touch screen 10. Resistive touch screen 10 comprises a transparent screen 11 that allows an underlying display (not shown) of an electronic system to be viewed. Wires 12, 13, 14, and 15 couple to resistive touch screen 10. Wires 12 and 13 couple to a first transparent conductive layer of resistive touch screen 10. Wires 14 and 15 couple to a second transparent conductive layer of resistive touch screen 10. The first and second transparent conductive layers are not in contact with each other under quiescent conditions. Although resistive touch screen 10 is shown having four wires there are many alternate embodiments having more than four wires for different screen configurations or to provide further features. In general, the various different resistive touch screens available to the consumer all operate on the same principal of creating contact between the first and second conductive layers when touched.

Figure 2:
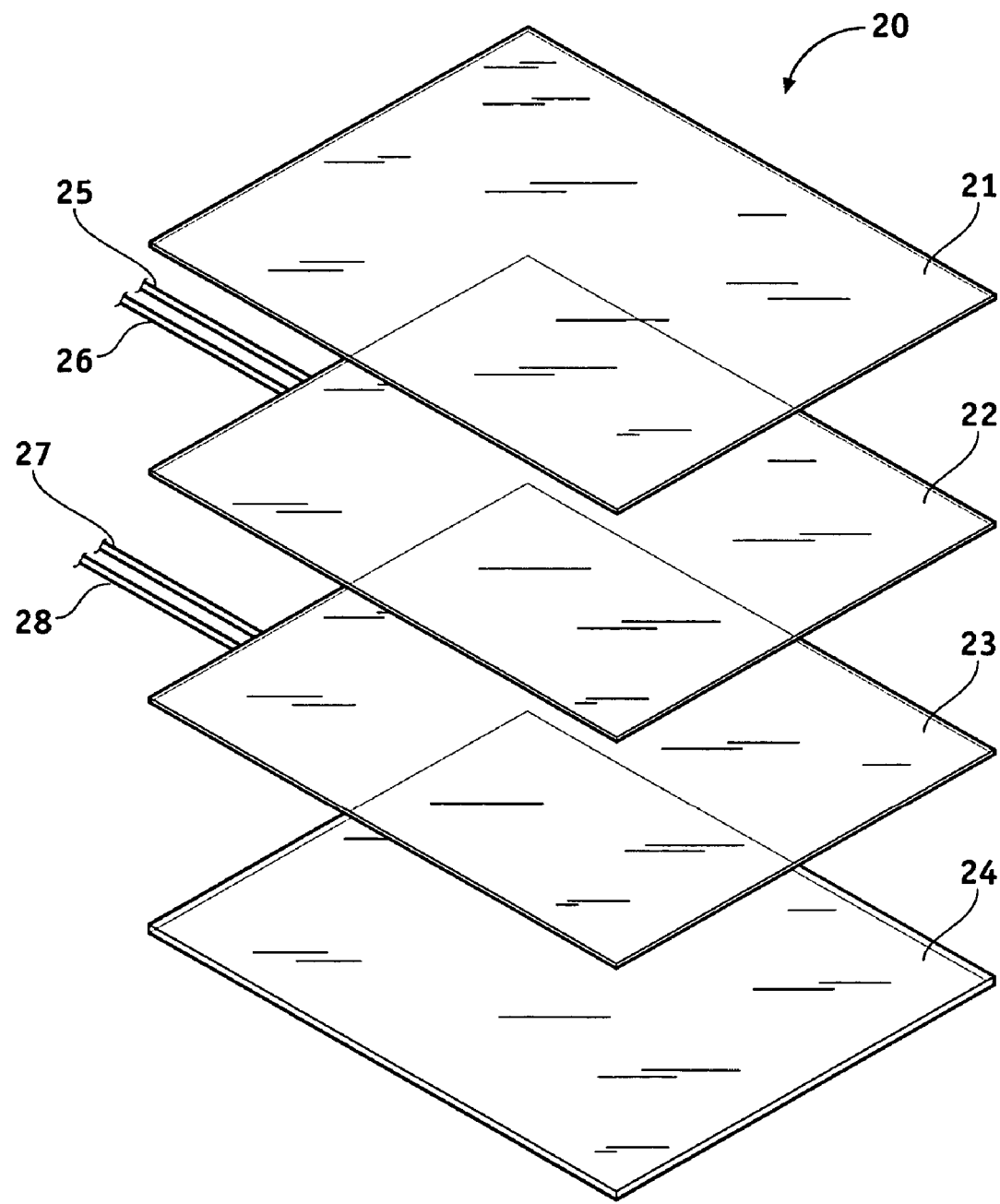
FIG. 2 is an exploded view showing layers of a prior art resistive touch screen.

FIG. 2 is an exploded view showing layers of a prior art resistive touch screen 20. Resistive touch screen 20 comprises a protective layer 21, a conductive layer 22, a conductive layer 23, and a protective hard backing layer 24. Spacers (not shown) are placed between conductive layers 22 and 23 to prevent contact with one another under quiescent conditions. Protective layer 21 is an outer layer of resistive touch screen 20 that is transparent, durable under contact, and scratch resistant. Protective layer 21 is exposed to the external environment and is contacted by a finger or other element such as a stylus or pen.

Conductive layers 22 and 23 are manufactured from a conductive transparent material. Typically, conductive layers 22 and 23 comprise indium tin oxide (ITO) or a resistive polyester material. The ITO can be deposited on a substrate such as glass if desired. In general, the resistance of conductive layers 22 and 23 fall within a range of 100 to 900 ohms. Spacing between conductive layers 22 and 23 is maintained by uniformly distributed spacer dots. Wires 25 and 26 couple to conductive layer 22. Wires 27 and 28 couple to conductive layer 23. One wire pair is coupled in the x-direction while the other wire pair is coupled in the y-direction. For example, conductive layer 22 is coupled such that wires 25 and 26 are respectively coupled in the y-direction on opposing sides of the resistive material. Conversely, conductive layer 23 is coupled such that wires 27 and 28 are respectively coupled in the x-direction on opposing sides of the resistive material. This allows conductive layers 22 and 23 to conduct a current by coupling the resistive layer between a reference voltage and ground.

Hard backing layer 24 is a transparent support structure to provide rigidity and strength to resistive touch screen 20. Protective layer 21 and conductive layers 22 and 23 overlie hard backing layer 24.

Figure 3:
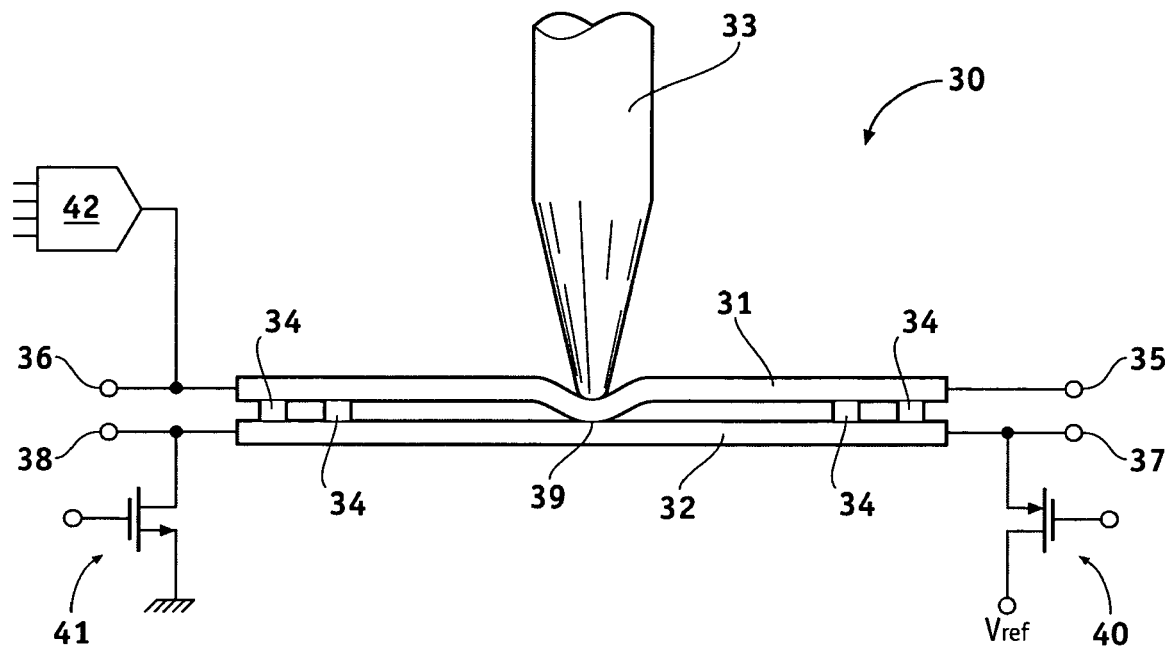
FIG. 3 is a cross-sectional view of a portion of conductive layers of a resistive touch screen being coupled together by a stylus.

FIG. 3 is a cross-sectional view of a portion of conductive layers of a resistive touch screen 30 being coupled together by a stylus 33. A conductive layer 31 and a conductive layer 32 are shown of the resistive touch screen. Under quiescent conditions, conductive layers 31 and 32 are separated from one another by spacer dots 34. Stylus 33 couples to conductive layer 31 deforming a surface of conductive layer 31 to contact conductive layer 32 at an area 39.

In this example, conductive layer 31 is coupled to an electrode 35 and an electrode 36. Electrodes 35 and 36 are coupled to opposing ends of conductive layer 31 in the y-direction. Conductive layer 32 is coupled to an electrode 37 and an electrode 38. Electrodes 37 and 38 are coupled to opposing ends of conductive layer 32 in the x-direction. In general, conductive layers 31 and 32 are coupled such that one conducts current in the x-direction while the other is coupled to conduct in the y-direction to allow a location on a screen to be identified when touched.

The illustration shows one half of a prior art methodology for determining a location of area 39 where contact is made on resistive touch screen 30. In the example, the location in the x-direction is determined. Transistor 40 couples a voltage $V_{ref}$ to electrode 37 when enabled. Transistor 41 couples electrode 38 to ground when enabled. Transistors 40 and 41 are enabled simultaneously to detect the x-direction position of area 39. Enabling transistors 40 and 41 biases conductive layer 32 to conduct a current. The resistance of conductive layer 32 is uniformly distributed from electrode 37 to electrode 38. The location in the x-direction is determined by sensing a voltage at area 39.

Figure 4:
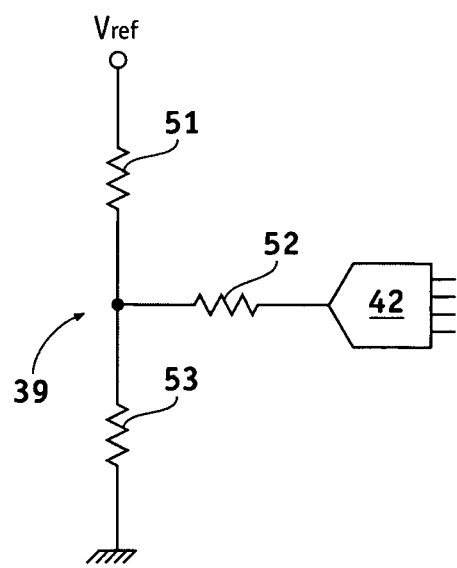
FIG. 4 is a schematic diagram representative of the resistive touch screen of FIG. 3.

FIG. 4 is a schematic diagram representative of resistive touch screen 30 of FIG. 3. Area 39 corresponds to a location where conductive layers 31 and 32 contact one another and defines a resistor 51 and a resistor 52 in conductive layer 32. Resistor 51 is the resistance of conductive layer 32 from electrode 37 to area 39. Resistor 52 is the resistance of conductive layer 32 from area 39 to electrode 38. Resistors 51 and 52 form a resistor divider where the voltage at area 39 corresponds to the location in the x-direction where stylus 33 of FIG. 3 contacts the resistive touch screen.

The voltage at area 39 is sensed through conductive layer 31 and coupled to electrode 36. Resistor 53 is the resistance of conductive layer 31 from area 39 to electrode 36. Electrode 36 couples to an analog to digital converter (DAC) 42 that converts the voltage at area 39 to a corresponding digital word. Resistor 53 and DAC 42 will have little impact on the measured voltage if the input resistance of DAC 42 is high in relation to the resistance value of resistors 51, 52, and 53.

Referring back to FIG. 3, sensing the location of the location of area 39 in the y-direction is achieved by applying the same methodology to conductive layer 31. For example, a reference and ground voltage is respectively coupled to electrodes 35 and 36 of conductive layer 31. A digital to analog converter is coupled to electrode 38 of conductive layer 32. A resistor divider is now formed in the y-direction through conductive layer 31 and the voltage at area 39 is detected through conductive layer 32. The voltage at area 39 corresponds to the location of area 39 in the y-direction. Note that both the x-direction and the y-direction are calculated to locate the position on the resistive touch screen where stylus 33 causes conductive layer 31 to contact conductive layer 32 in area 39. Thus, the resistive touch screen in a quiescent condition (screen is not touched) is continuously switching back and forth between biasing conducting layers 31 and 32. In general, the voltage sensed by the analog to digital converter coupled to either conductive layers 31 and 32 under quiescent conditions does not change substantially. Touching the resistive screen produces a change in voltage to the analog to digital converter indicating information is being input.

The methodology described hereinabove for detecting a point of contact on a resistive touch screen has several issues. First, switching between biasing conductive layers 31 and 32 creates a significant amount of noise and voltage spikes. The noise can produce erroneous results or reduce the accuracy of measurements when coupled to the interface circuitry of the resistive touch screen. Second, switching between biasing conductive layers 31 and 32 is very power inefficient since power is dissipated whether the resistive touch screen is being used or not. Third, the wires from the resistive touch screen are often accessible as they couple to a main circuit board. Security can be compromised by someone coupling to the wires to detect the voltage changes that occur when the resistive touch screen is touched. Monitoring the voltage changes is easily converted to the data being input thus allowing someone to obtain information such as a password or signature to access an account and illegally obtain the contents of the account.

Figure 5:
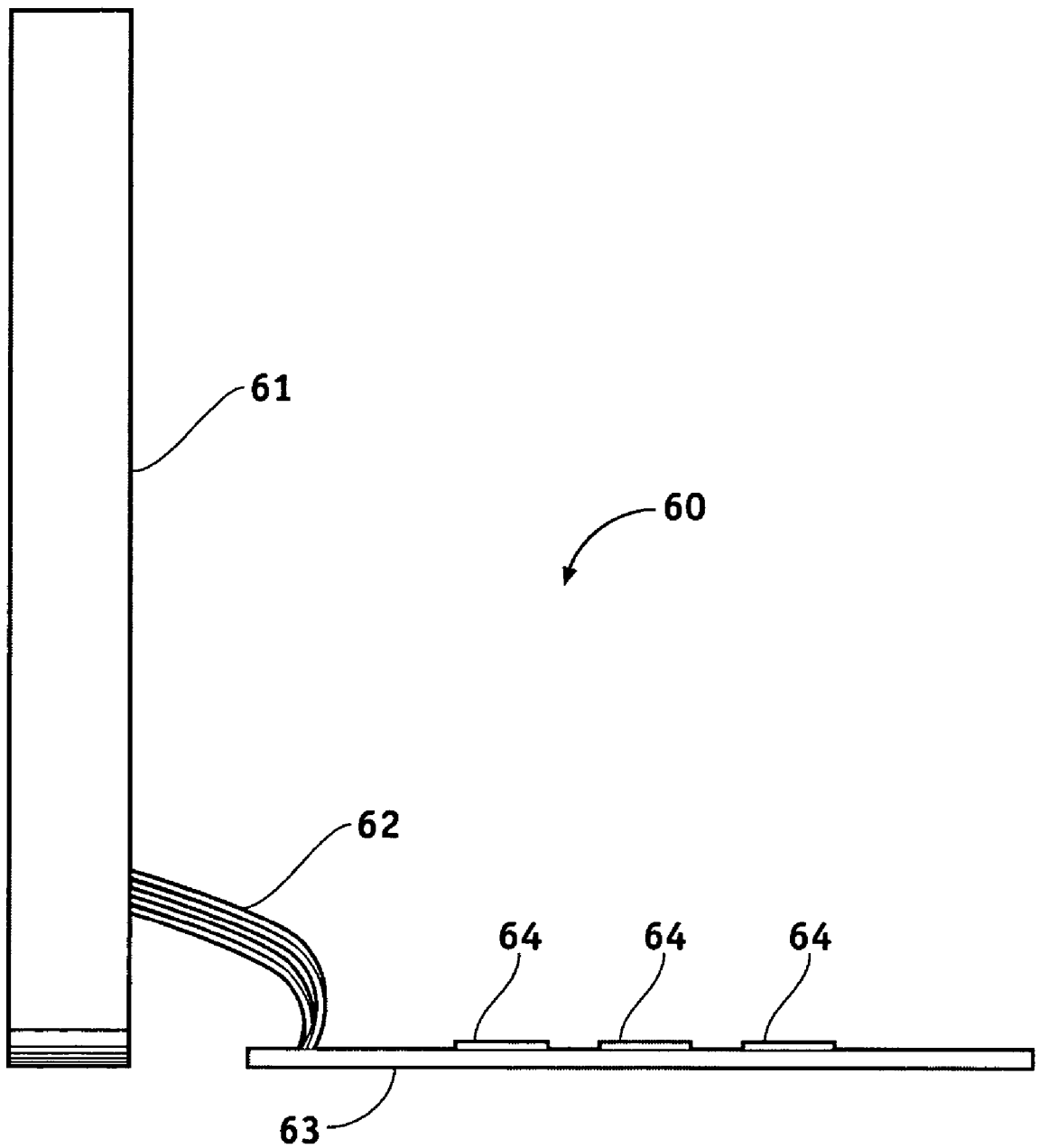
FIG. 5 is an illustration of a resistive touch screen coupled to a printed circuit board in accordance with the present invention.

FIG. 5 is an illustration of a resistive touch screen 61 coupled to a printed circuit board 63 in accordance with the present invention. Typically, resistive touch screen 61 is coupled by wires 62 to printed circuit board 63 that are exposed and accessible for tapping or monitoring making them a security threat for sensitive information. Integrated circuits 64 are coupled together by interconnect on printed circuit board 63 to form an interface circuit for processing signals on wires 62 from resistive touch screen 61. In an exemplary embodiment, resistive touch screen 61 is biased such that the voltage on wires 62 remain constant during quiescent conditions or when data is being input (screen 61 is touched). The data being input is more secure because monitoring the voltage on wires 62 does not yield any usable information because the voltage on each wire does not change.

Figure 6:
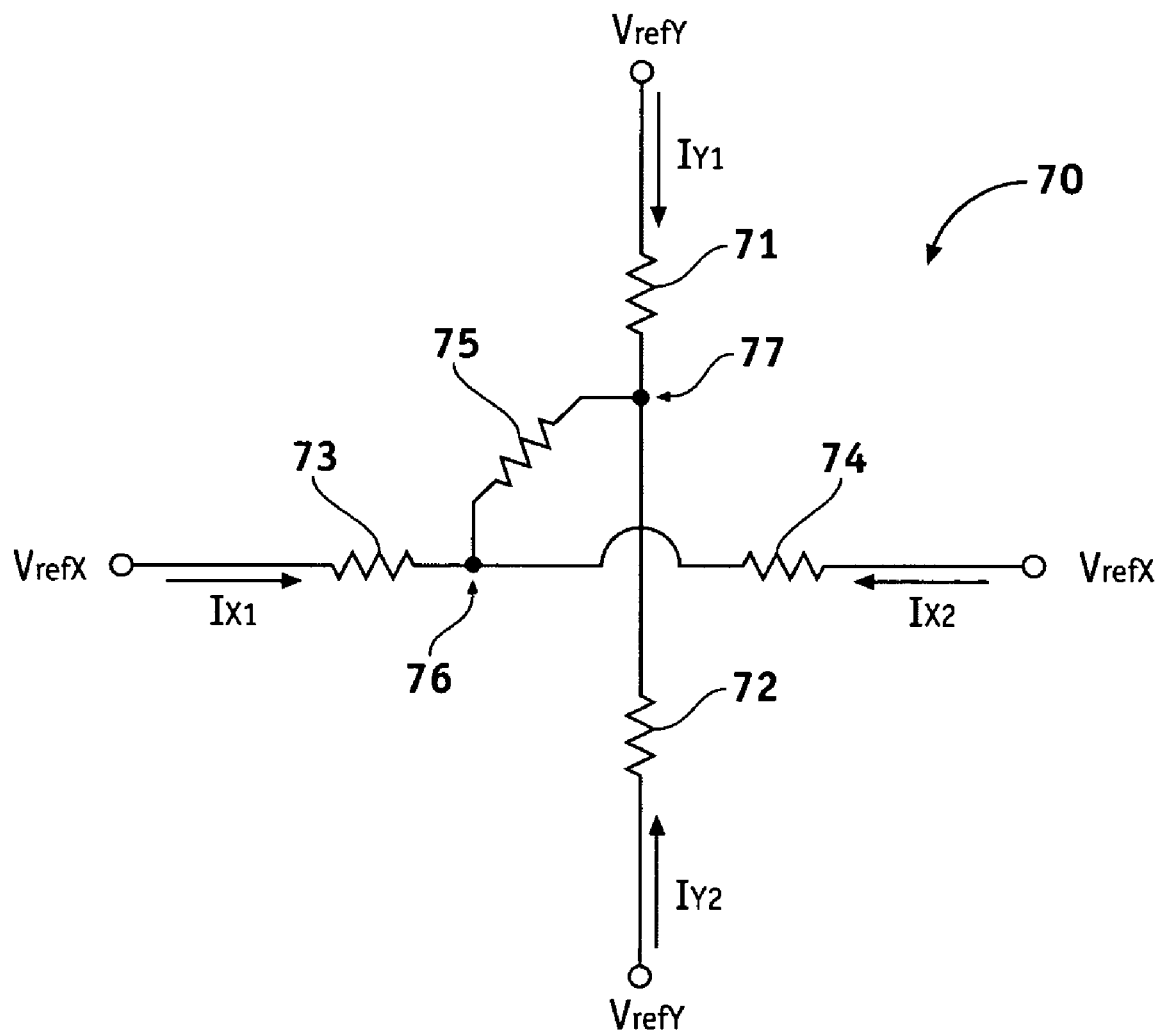
FIG. 6 is a schematic diagram illustrating a resistive touch screen being touched in accordance with the present invention.

FIG. 6 is a schematic diagram illustrating a resistive touch screen 70 being touched in accordance with the present invention. The schematic representation is simplified to show the operation of resistive touch screen 70. In general, resistive touch screen has a first conductive layer and a second conductive layer that under quiescent conditions do not contact one another. One conductive layer is biased such that current flows in the y-direction and the other such that current flows in the x-direction.

In an embodiment of resistive touch screen 70, the first conductive layer has a first electrode and a second electrode coupled to opposing ends of the first conductive layer in the y-direction. The first and second electrode of the first conductive layer are coupled to the same reference voltage $V_{refY}$. Thus, under quiescent conditions no current (or substantially no current) flows through the first conductive layer since the operating potential across the layer is zero. This could be modeled as a resistor where both terminals are coupled to the same voltage.

In an embodiment of resistive touch screen 70, the second conductive layer has a first electrode and a second electrode coupled to opposing ends of the second conductive layer in the x-direction. The first and second electrode of the second conductive layer are coupled to a reference voltage $V_{refX}$. Thus, under quiescent conditions no current (or substantially no current) flows through the second conductive layer since the operating potential across the layer is zero. It should be noted, that no power is dissipated (or substantially no power) by resistive touch screen 70 when resistive touch screen 70 is not touched thereby greatly increasing the operating efficiency of the device. Prior art, resistive touch screens switch back and forth between biasing the conductive layers thereby continuously dissipating power.

Touching resistive touch screen 70 causes the first and the second conductive layers to contact one another and is represented in the simplified schematic diagram in FIG. 6. The first conductive layer of resistive touch screen 70 is modeled as a resistor 71 and a resistor 72. The second conductive layer of resistive touch screen 70 is modeled as a resistor 73 and a resistor 74. A resistor 75 is a junction resistance at the point of contact, or the touch point where the first and second conductive layers of resistive touch screen 70 contact one another.

Unlike the quiescent condition, current is conducted at the first and second electrodes of the first and second conductive layers when resistive touch screen 70 is touched. A current $I_{y1}$ is conducted at the first electrode of the first conductive layer and a current $I_{y2}$ is conducted at the second electrode of the first conductive layer. Similarly, a current $I_{x1}$ is conducted at the first electrode of the second conductive layer and a current $I_{x2}$ is conducted at the second electrode of the second conductive layer when resistive touch screen 70 is touched.

The position where resistive touch screen 70 was touched can be calculated using Ohm's Law. A voltage $V_{T1}$ is defined as the voltage at node 76. A voltage $V_{T2}$ is defined as the voltage at node 77. Resistors 71, 72, 73, 74, and 75 are respectively $R_{71}$, $R_{72}$, $R_{73}$, $R_{74}$, and $R_{75}$.

The voltage at node 76 ($V_{T1}$) calculated from the first electrode of the second conductive layer is represented by equation 1.

$$V_{T1}=V_{refX}-I_{x1}*R_{73} \qquad \text{Equation 1}$$

The voltage at node 76 ($V_{T1}$) calculated from the second electrode of the second conductive layer is represented by equation 2.

$$V_{T1}=V_{refX}-I_{x2}*R_{74} \qquad \text{Equation 2}$$

The voltage at node 77 ($V_{T2}$) calculated from the first electrode of the first conductive layer is represented by equation 3.

$$V_{T2}=V_{refY}-I_{y1}*R_{71} \qquad \text{Equation 3}$$

The voltage at node 77 ($V_{T2}$) calculated from the second electrode of the first conductive layer is represented by equation 4.

$$V_{T2}=V_{refY}-I_{y2}*R_{72} \qquad \text{Equation 4}$$

Equating equations 1 and 2 yields equation 5.

$$I_{x1}*R_{73}=I_{x2}*R_{74} \qquad \text{Equation 5}$$

Similarly, equation 3 and 4 yields equation 6.

$$I_{y1}*R_{71}=I_{y2}*R_{72} \qquad \text{Equation 6}$$

From Ohm's Law an equation 7 is developed that relates currents and resistances of the second conductive layer of resistive touch screen 70.

$$I_{x2}*(R_{73}+R_{74})=R_{73}*(I_{x1}+I_{x2}) \qquad \text{Equation 7}$$

A resistor divider that corresponds to the relative position where contact to resistive touch screen 70 is made in the x-direction is related to the currents sensed at the first and second electrodes of the second conductive layer. Thus, the position of the location in the x-direction where resistive touch screen 70 is touched can be calculated from the currents $I_{x1}$ and $I_{x2}$ at the first and second electrodes using equation 8. The ratio is the position between the first and second electrodes of the second conductive layer relative to the first electrode. In other words, if the ratio is approaches 0 the touch point is close to the first electrode. Conversely, if the ratio approaches 1 the touch point is close to the second electrode.

$$R_{73}/(R_{73}+R_{74})=I_{x2}/(I_{x1}+I_{x2}) \qquad \text{Equation 8}$$

From Ohm's Law an equation 9 is developed that relates currents and resistances of the first conductive layer of resistive touch screen 70.

$$I_{y2}*(R_{71}+R_{72})=R_{71}*(I_{y1}+I_{y2}) \qquad \text{Equation 9}$$

A resistor divider that corresponds to the relative position where contact to resistive touch screen 70 is made in the y-direction is related to the currents sensed at the first and second electrodes of the first conductive layer. Thus, the position of the location in the y-direction where resistive touch screen 70 is touched can be calculated from the currents $I_{y1}$ and $I_{y2}$ at the first and second electrodes of the first conductive layer of resistive touch screen 70 using equation 10. Similar to equation 8, the ratio is the position between the first and second electrodes of the first conductive layer relative to the first electrode. In other words, if the ratio is approaches 0 the touch point is close to the first electrode. Conversely, if the ratio approaches 1 the touch point is close to the second electrode.

$$R_{71}/(R_{71}+R_{72})=I_{y2}/(I_{y1}+I_{y2}) \qquad \text{Equation 10}$$

The pressure on the area being touched can also be calculated. The pressure corresponds to the value of resistor 75. The pressure versus resistance is characterized for a given resistive touch screen type because screens will differ depending on the process of manufacture. Equation 11 equates the difference in the two reference voltages ($V_{refX}$ and $V_{refY}$) being provided to resistive touch screen 70 to the currents and resistors.

$$V_{refX}-V_{refY}=(R_{73}*I_{x1})-(I_{y1}+I_{y2})*R_{75}-(R_{73}*I_{x1}) \qquad \text{Equation 11}$$

A value for resistor $R_{75}$ can then be calculated using equation 12 and correlated to the pressure for the specific screen being used.

$$R_{75}=[(R_{73}*I_{x1})-(R_{73}*I_{x1})-(V_{refX}-V_{refY})]/(I_{y1}+I_{y2}) \qquad \text{Equation 12}$$

An additional benefit of sensing currents from resistive touch screen 70 is that it is possible to detect when an intruder is attempting to monitor the data being input. The integer sum of all the currents at the first and second electrodes of the first and second conductive layers of resistive touch screen 70 is zero (Kirchoff's Law). The current magnitudes can be examined on a periodic basis or prior to responding to data input. The current magnitudes are added together with the result being approximately zero. If the result is not zero, there would be the possibility that current is being leaked or injected by an intruder attempting to monitor data input to resistive touch screen 70. An alert signal can be output that makes the system aware of this potential problem such that appropriate actions are taken (such as shutting down the system) until the issue is resolved.

Figure 7:
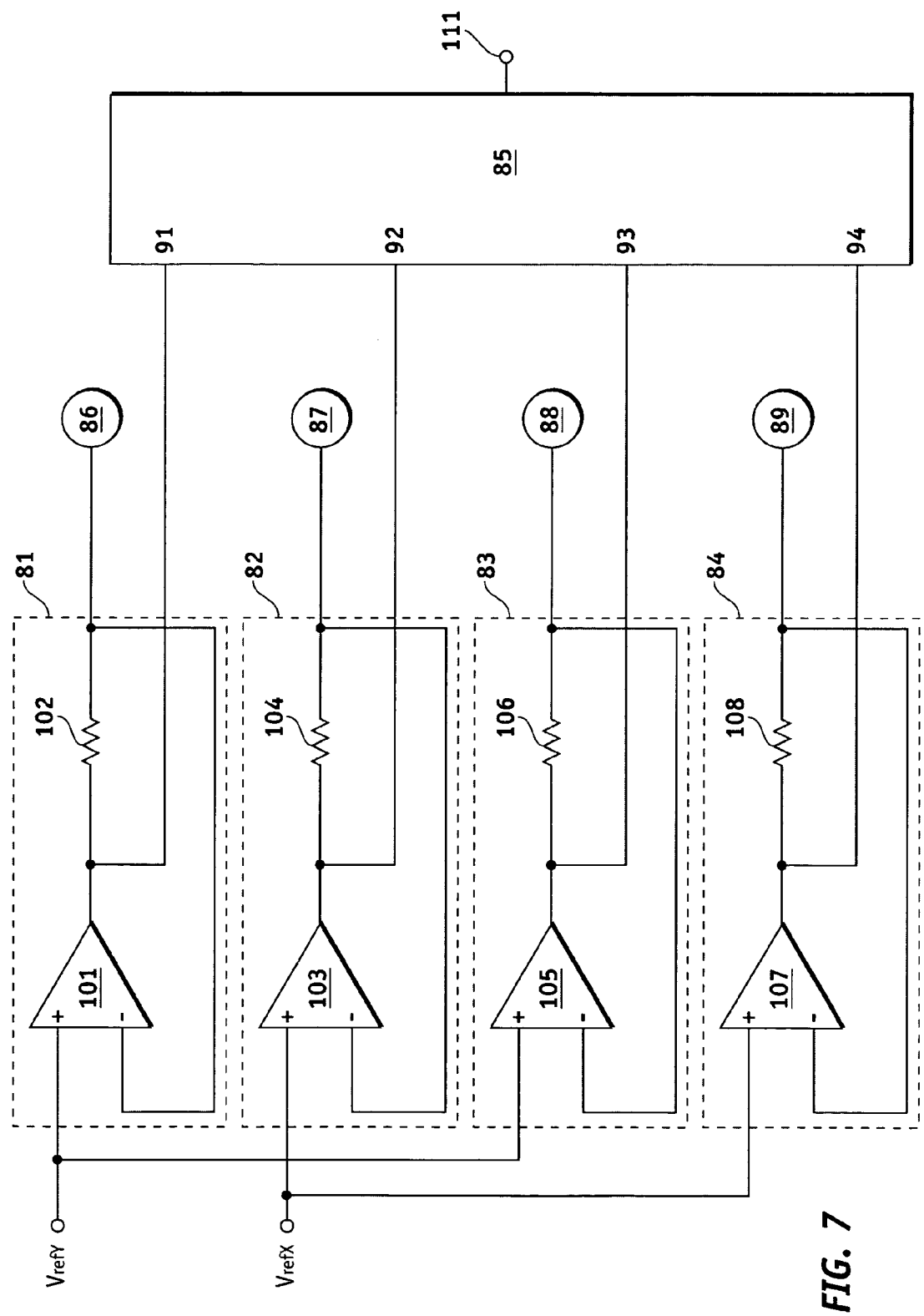
FIG. 7 is a schematic diagram illustrating circuitry for interfacing with a resistive touch screen in accordance with the present invention.

FIG. 7 is a schematic diagram illustrating circuitry for interfacing with a resistive touch screen in accordance with the present invention. The interface circuitry comprises current to voltage converters 81, 82, 83, and 84, and an analog to digital converter (A/D) 85. In general, current to voltage converters 81-84 form a detection circuit that senses currents from the resistive touch screen when touched while providing and maintaining a constant voltage to the conductive layers of the resistive touch screen. Each current to voltage converters 81-84 is responsive to a current from the resistive touch screen and outputs a voltage that corresponds to the current magnitude. A/D converter 85 converts an analog voltage coupled from current to voltage converters 81-84 to a corresponding digital word. In an embodiment of the interface circuitry, a terminal 86 and a terminal 88 respectively couples to the first and second electrodes of a first conductive layer of the resistive touch screen similar to that described in FIG. 6. In an embodiment of the interface circuitry, a terminal 87 and a terminal 89 respectively couples to the first and second electrodes of a second conductive layer of the resistive touch similar to that described in FIG. 6.

Current to voltage converter 81 comprises an amplifier 101 and a resistor 102. Amplifier 101 has a positive input coupled to a reference voltage $V_{refY}$, a negative input coupled to terminal 86, and an output. Resistor 102 has a first terminal coupled to the output of amplifier 101 and a second terminal coupled to terminal 86.

Current to voltage converter 83 comprises an amplifier 105 and a resistor 106. Amplifier 105 has a positive input coupled to a reference voltage $V_{refY}$, a negative input coupled to terminal 88, and an output. Resistor 106 has a first terminal coupled to the output of amplifier 105 and a second terminal coupled to terminal 88.

Current to voltage converter 82 comprises an amplifier 103 and a resistor 104. Amplifier 103 has a positive input coupled to a reference voltage $V_{refX}$, a negative input coupled to terminal 87, and an output. Resistor 104 has a first terminal coupled to the output of amplifier 103 and a second terminal coupled to terminal 87.

Current to voltage converter 84 comprises an amplifier 107 and a resistor 108. Amplifier 107 has a positive input coupled to a reference voltage $V_{refX}$, a negative input coupled to terminal 89, and an output. Resistor 108 has a first terminal coupled to the output of amplifier 107 and a second terminal coupled to terminal 89.

Analog to digital converter 85 has an input channel 91 coupled to the output of amplifier 101, an input channel 92 coupled to the output of amplifier 103, an input channel 93 coupled to the output of amplifier 105, an input channel 94 coupled to the output of amplifier 107, and a digital output bus 111.

The detection circuit provides the constant reference voltages ($V_{refX}$ and $V_{refY}$) to the resistive touch screen. In general, current to voltage converters 81-84 operate similarly, each being coupled to a reference voltage (either $V_{refX}$ and $V_{refY}$). In particular, amplifiers 101, 103, 105, and 107 are configured to drive the output to a voltage that forces the negative input of the amplifier to be an equal voltage as the positive input. In other words, the amplifier will always drive the negative input to a voltage substantially equal to the reference voltage ($V_{refX}$ or $V_{refY}$) coupled to the positive input of the amplifier. Thus, terminals 86 and 88 output a voltage of approximately $V_{refY}$ and terminals 87 and 89 output a voltage of approximately $V_{refX}$. As mentioned previously, terminals 86-89 couple to the resistive touch screen. The voltage at terminals 86-89 remain substantially constant under both quiescent conditions and when the resistive touch screen is touched thereby enhancing security by preventing information from being stolen by sensing voltage changes on the lines coupling the resistive touch screen to the interface circuitry.

For example, the positive input of amplifier 101 is coupled to a voltage $V_{refY}$. Amplifier 101 drives the output to a voltage that yields a voltage of approximately $V_{refY}$ at the negative input of amplifier 101. The output of amplifier 101 couples through resistor 102 to terminal 86. Under quiescent conditions, the resistive touch screen outputs substantially zero current as described in FIG. 6. Thus, the output of amplifier 101 under quiescent conditions is at a voltage of approximately $V_{refY}$. Conversely, when the resistive touch screen is touched, currents are generated at the electrodes of the resistive touch screen as described in the equations of FIG. 6. A current received at terminal 86 changes the voltage across resistor 102 thereby changing the voltage at the negative input of amplifier 101. Amplifier 101 responds immediately to the differential voltage created across the positive and negative inputs of amplifier 101 generating a voltage at the output of amplifier 101 that reduces the differential voltage to approximately zero volts. Amplifier 101 responds to any current change at terminal 86 to maintain the voltage at $V_{refY}$. The voltage at the output of amplifier 101 that maintains the voltage at $V_{refY}$ corresponds to the current at terminal 86. The current is calculated from the known voltages at either terminal of resistor 102 and the resistance value of resistor 102. Current to voltage converters 82, 83, and 84 respond similar to changes in current respectively at terminals 87, 88, and 89.

Analog to digital converter 85 receives the voltages at the outputs of amplifiers 101, 103, 105, and 107 respectively at input channels 91-94. In an embodiment of the interface circuitry, each input channel of A/D converter 85 can be selected to sample and convert the voltage to a corresponding digital word. Typically, A/D converter 85 samples and outputs a digital word for each amplifier of the detection circuit sequentially. Digital output bus 111 couples to a microcontroller, microprocessor, digital signal processing unit, or other logic unit that is capable of receiving the digital words output by A/D converter 85 (corresponding to currents at each electrode of the resistive touch screen) and computing the location where the screen was touched using the model described in FIG. 6. The pressure can also be calculated from the currents output from the resistive touch screen.

As mentioned previously, the resistive touch screen dissipates little or no power under quiescent conditions. The electrodes of a conductive layer are coupled to equal voltages producing a net differential voltage of zero across the conductive layer. Further power savings are achieved in the exemplary embodiment by lowering the reference voltage applied to each conductive layer of the resistive touch screen. The voltage can be lowered because a current, not voltage, is being detected from the resistive touch screen. In an embodiment of the interface circuitry, the reference voltages lowered to a value of approximately 1 volt because the current levels generated at this voltage are easily detected and converted for sensing. Prior art resistive touch screen interface circuits operate at substantially higher voltages (e.g., five volts). Moreover, no switching is required between the conductive layers of the resistive touch screen, so minimal noise is generated. Furthermore, the scan rate can be increased to the level of the analog to digital converter, thereby increasing the performance of the system. This results in an increase in sensing accuracy and a reduction in the time required to determine the location where the resistive touch screen is being touched.

Figure 8:
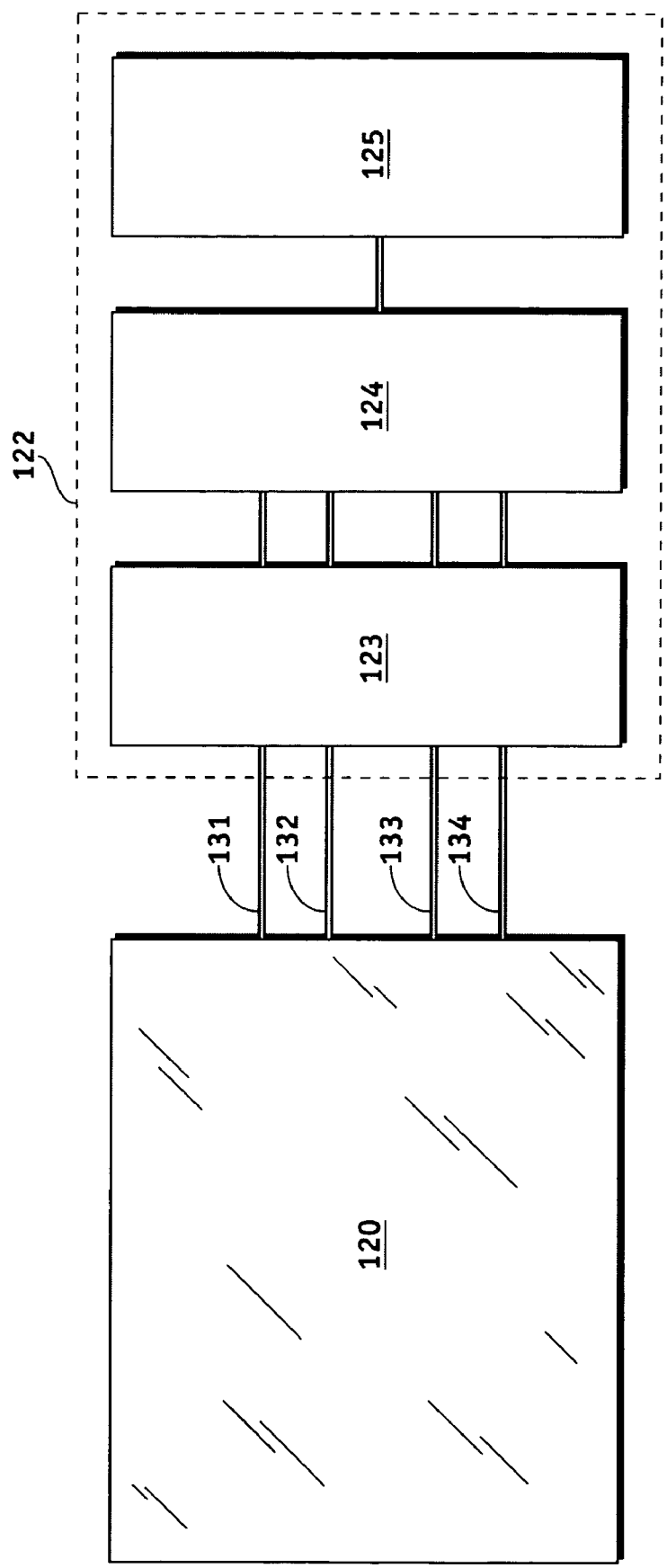
FIG. 8 is a block diagram illustrating an apparatus for inputting data in accordance with the present invention.

FIG. 8 is a block diagram illustrating an apparatus for inputting data in accordance with the present invention. A detection circuit 123 is responsive to a resistive touch screen 120. In an embodiment of the apparatus, resistive touch screen 120 is coupled to detection circuit 123 through wires 131-134. Resistive touch screen 120 includes a first conductive layer and a second conductive layer. Wires 131 and 132 couple to a first and a second electrode of the first conductive layer. Wires 133 and 134 couple to a first and a second electrode of the second conductive layer.

The first and second electrodes of the first conductive layer of resistive touch screen 120 couple to opposing ends of the first conductive layer. Similarly, the first and second electrodes of the second conductive layer of resistive touch screen 120 couple to opposing ends of the second conductive layer. The direction of current flow Through the first and second conductive layers are chosen to have different orientations thereby allowing a location where the first and second conductive layers contact one another to be determined when resistive touch screen is touched. In an embodiment of the apparatus, the first and second electrodes of the first conductive layer are oriented so that current flows through the first conductive layer in the y-direction. Conversely, the first and second electrodes of the second conductive layer are oriented so current flows through the second conductive layer in the x-direction. It should be noted that other orientations could be used and that the different orientations could be applied to either conductive layer of the resistive touch screen.

Detection circuit 123 provides a first reference voltage to wires 131 and 132 thus applying equal voltage to the first and second electrode of the first conductive layer of resistive touch screen 120. Similarly, a second reference voltage is provided to wires 133 and 134 by detection circuit 123 thus applying equal voltage to the first and second electrode of the second conductive layer of resistive touch screen 120. Detection circuit 123 maintains the first reference voltage constant to the first conductive layer and the second reference voltage constant to the second conductive layer under quiescent conditions or when resistive touch screen 120 is touched (causing the first and second conductive layers to couple to one another). The voltage on wires 131-134 remain substantially constant during operation of resistive touch screen 120. This prevents someone from stealing the data being input to resistive touch screen 120 by monitoring the voltage on wires 131-134. Applying equal voltages to the first and second electrodes of either the first and second conductive layers reduces power consumption of resistive touch screen 120 to approximately zero during quiescent conditions (the first and second conductive layers are not coupled together).

In an embodiment of the apparatus, detection circuit 123 comprises four current to voltage converters. Wires 131-134 couple currents to detection circuit 123 when resistive touch screen 120 is touched causing the first conductive layer to couple to the second conductive layer. The magnitude of the currents on each wire correspond to a location where resistive touch screen 120 is touched as described in detail in FIG. 6. Detection circuit 123 maintains constant voltages on wires 131-134 and outputs voltages corresponding to the magnitude of the currents received.

In an embodiment of the apparatus, detection circuit 123, an analog to digital (A/D) converter 124, and a microcontroller 125 are coupled to a substrate 122. In an embodiment of the apparatus, substrate 122 is a printed circuit board having interconnect to couple detection circuit 123, A/D converter 124, and microcontroller 123 together. A/D converter 124 is responsive to detection circuit 123. A/D converter 124 converts voltages output by detection circuit 123 to digital words corresponding to the voltage levels. The digital words are provided to microcontroller 125. Microcontroller 125 calculates a location of where resistive touch screen 120 is touched from the digital words. The digital words correspond to the currents produced by resistive touch screen 120 when touched. In an embodiment of the apparatus, microcontroller 125 calculates the location using equations derived and described in FIG. 6. Microcontroller 125 can also calculate the pressure applied to resistive touch screen 120 when touched as described in FIG. 6.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of operating a resistive touch sensitive screen for increased security and lower power consumption, the resistive touch screen comprising a first conductive layer and a second conductive layer, the first conductive layer having a first electrode and a second electrode, the second conductive layer having a first electrode and a second electrode, the method comprising the steps of:
   applying substantially equal voltages to the first and second electrodes of the first conductive layer;
   applying substantially equal voltages to the first and second electrodes of the second conductive layer such that approximately zero current is conducted in the first and second conductive layers under quiescent conditions;
   measuring currents from the first and second electrodes of the first conductive layer;
   measuring currents from the first and second electrodes of the second conductive layer;
   adding the currents from the first and second electrodes of the first and second conductive layers together; and
   sending an alert signal when the currents from the first and second electrodes of the first and second conductive layers added together do not equal approximately zero.

2. The method of operating a resistive touch sensitive screen as recited in claim 1 further including the steps of:
   touching the resistive touch sensitive screen such that the first conductive layer couples to the second conductive layer; and
   determining a location where the resistive touch sensitive screen is touched using currents from the first and second electrodes of the first conductive layer and currents from the first and second electrodes of the second conductive layer.

3. The method of operating a resistive touch sensitive screen as recited in claim 2 further including a step of determining a pressure applied to the resistive touch sensitive screen using currents from the first and second electrodes of the first conductive layer and currents from the first and second electrodes of the second conductive layer.

4. An apparatus comprising:
   a resistive touch screen;
   a substrate;
   a plurality of current to voltage converters on said substrate responsive to said resistive touch screen; and
   a plurality of wires coupling said resistive touch screen to said plurality of current to voltage converters, wherein a voltage on each of said plurality of wires remains substantially constant during operation of said resistive touch screen;
   an A/D converter on said substrate responsive to said plurality of current to voltage converters;
   a microcontroller on said substrate responsive to said A/D converter;
   wherein the resistive touch screen comprises a first conductive layer and a second conductive layer, the first conductive layer having a first electrode and a second electrode, the second conductive layer having a first electrode and a second electrode;
   a detection circuit configured to measure currents from the first and second electrodes of the first conductive layer and currents from the first and second electrodes of the second conductive layer, and to add the currents from the first and second electrodes of the first and second conductive layers together; and
   an alarm coupled to the detection circuit and configured to send an alert signal when the currents from the first and second electrodes of the first and second conductive layers added together do not equal approximately zero.

5. An apparatus responsive to a resistive touch screen, of the type having a first conductive layer and a second conductive layer separated from one another under a quiescent condition and coupled with each other during a touch condition, said first and second conductive layers each having a first and a second electrode, the apparatus comprising:

a detection circuit coupled to said resistive touch screen, said detection circuit configured to provide a first reference voltage to said first and second electrodes of said first conductive layer and to provide a second reference voltage to said first and second electrodes of said second conductive layer, wherein said detection circuit maintains said first and second reference voltages substantially constant during said touch condition;

wherein the detection circuit is configured to measure currents from the first and second electrodes of the first conductive layer and currents from the first and second electrodes of the second conductive layer, and to add the currents from the first and second electrodes of the first and second conductive layers together, and wherein the apparatus further comprises an alarm coupled to the detection circuit and configured to send an alert signal when the currents from the first and second electrodes of the first and second conductive layers added together do not equal approximately zero.

* * * * *